United States Patent Office 3,400,116
Patented Sept. 3, 1968

3,400,116
TREATING POLYMER COMPOSITIONS AND
PRODUCT RESULTING THEREFROM
Paul J. Boeke, Bartlesville, Okla., assignor to Phillips
Petroleum Company, a corporation of Delaware
No Drawing. Continuation-in-part of application Ser. No.
300,082, Aug. 5, 1963. This application Mar. 22, 1965,
Ser. No. 441,887
4 Claims. (Cl. 260—94.9)

ABSTRACT OF THE DISCLOSURE

Debilitative action to surface of plastic articles is reduced by impregnating the surface of the article with an antidebilitative agent. The agent is applied to the plastic article by precoating the molding means therewith prior to formation of the desired article.

---

This application is a continuation-in-part of Ser. No. 300,082, filed Aug. 5, 1963.

This invention relates to a method for the protection and treatment of organic polymer compositions and to the treated composition obtained therefrom. In one aspect this invention relates to a method for preventing and reducing electrostatic charges on organic polymer compositions. In a further aspect, this invention relates to a novel method for the application of destaticizing agents to formed polymer compositions. In another aspect, this invention relates to a method for treating formed articles of olefin polymers with agents in a manner which avoids decomposition of the agents or other reduction of their effective lives. In a preferred aspect, this invention relates to a method for treating formed articles of olefin polymers with destaticizing agents in a manner which avoids decomposition of the agent or reduction otherwise of its effective life.

It is known that molded articles which are fabricated from resinous polymers are subjected to many debilitative conditions or to agents which ultimately render the molded article unsuitable for its originally intended purpose. For example, fibers, films, sheets and molded articles fabricated with resinous polymers of monoolefins are subject to the development of objectionable properties such as that resulting from the accumulation of electrostatic charges thereupon. Included among the procedures heretofore followed for alleviation of these problems were the incorporation of certain additives into the resin and direct application of the materials to the surface of the fabricated article. However, numerous problems have been encountered in these operations. Additives incorporated into the resin may undergo decomposition at the temperatures employed at the fabrication operations, thereby rendering the additives inactive, or the decomposition products resulting therefrom may lead to objectionable color and odor developments. On the other hand, the so-called wipe-on materials heretofore used can be lost from the surface by evaporation or oxidative changes or by mechanical abrasion effects encountered in shipping, handling, storage and the like. Further, it has been found that materials successful in eliminating undesirable properties for one type of resin are often resin-specific and may be much less effective for another type of resin. For example, antistatic materials which are highly effective for low-density polyethylene are frequently much less satisfactory for high-density polyethylene.

In addition to the problems which are presented by the buildup of static charges on the surface of the formed article, it has also been found that molded items are susceptible to damage by rodents, insects, and bacteria as well as by oxidation and ultraviolet light.

Thus an object of this invention is to provide a method for protecting the surface of solid polymeric compositions from debilitative conditions. Another object of this invention is to provide a novel composition of a solid polymer having the surface thereof impregnated with an anti-debilitative agent. Other objects, advantages and features of the invention will be readily apparent to those skilled in the art from the description and the appended claims.

Broadly, in accordance with this invention, I have now found that adequate and enduring protection from the debilitative action is achieved by adding an anti-debilitative agent to the molded item by applying same to the surface of the molds used to form such articles.

In a preferred embodiment of this invention, it has now been found that the surfaces of articles fabricated from polymers of 1-olefins are provided long-term protection by applying to the surface of the molds used to form such articles agents which are capable of altering the properties of the polymer without adversely affecting the physical properties thereof. Such an agent is a compound of the general formula

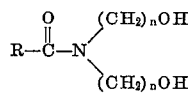

wherein R is an alkyl group containing from 6 to 16 carbon atoms and $n$ is an integer of from 2 to 4. Typical of such dialkanol amide compounds are the diethanol amide of heptanoic acid, the diethanol amide of decanoic acid, the diethanol amide of lauric acid, the diethanol amide of pentadecanoic acid, the diethanol amide of heptadecanoic acid, the dipropanol amide of heptanoic acid, the dipropanol amide of pelargonic acid, the dipropanol amide of pentadecanoic acid, the dipropanol amide of lauric acid, the dipropanol amide of heptadecanoic acid, the dibutanol amide of heptanoic acid, the dibutanol amide of caprylic acid, the dibutanol amide of pelargonic acid, the dibutanol amide of decanoic acid, the dibutanol amide of lauric acid, the dibutanol amide of pentadecanoic acid, and the dibutanol amide of heptadecanoic acid. These and other compounds can be made by any suitable method, such as by the reaction of an acyl chloride with the desired dialkanol amide. Presently preferred is the diethanol amide of lauric acid which can be prepared by reacting diethanol amine with lauroyl chloride.

The term "anti-debilitative agents" is intended to include any agent which serves to prevent damage to or attack of the polymer surface. Included in these agents are: antioxidants, such as 2,2'-thiobis(6-cyclohexyl-p-cresol), 4,4'-thiobis(6-tert-butyl-m-cresol), and 2,6-di-tert-butyl-p-cresol; ultraviolet stabilizers such as hexaphenyl benzene, tertiary butyl phenyl salicylate and 2-hydroxy-5-alkylbenzophenone; rodent repellants such as N,N-dimethylsulfenyldithiocarbamate; antistatic agents such as the alkanol amides; insecticides or insect repellants such as dimethyl-2-picoline, 1,1,1-trichloro,2,2-bis(p-chlorophenyl)ethane, di-n-propylpyridine - 2,5 - dicarboxylate; bactericides such as 2,2'-methylene-bis[3,4,6-trichlorophenol] as well as fungicides and the like.

These alkanol amides, as well as the other anti-debilitative agents, are applied to the surface of the mold used in forming the article in any suitable manner, such as spraying, dusting or wiping and the like. For example, one acceptable procedure is by dissolving the dialkanol amide in an alcohol, such as isopropyl alcohol, and applying the admixture to the surface of the mold either by spraying immediately prior to molding or by wiping the admixture onto the surface of the mold.

Any volatile inert liquid is useful if it is a solvent for the dialkanol amide or other anti-debilitative agent, is inert to the polymer and the dialkanol amide or other agents, and is volatile at the conditions of application. Suitable materials include alcohols having from 1 to 5 carbon atoms per molecule, including methanol, ethanol, propanol, isopropanol, butanol, isobutanol, pentanol and the like. A particularly suitable mixture comprises from 95 to 80 parts by weight of the volatile inert liquid and from 5 to 20 parts by weight of the dialkanol amide or other anti-debilitative agest based on the total composition weight.

The solvent evaporates quickly under normal conditions, leaving a mold coating which is imparted to the object as it is molded which will prevent accumulation of electrostatic charges on the article for many months. This is very surprising since most antistatic agents are readily removed by rubbing once or twice with a cloth or by other mechanical abrasion. In addition, this development is surprising since it has been found that these long chain dialkanol amides are, for most practical purposes, incompatible with the polyolefins. The incorporation of the dialkanol amide directly into the polymer in a Banbury mixer, roller, or extruder thus does not present a favorable avenue for the treatment of the polyolefin polymer. In contrast, the treating agent when applied to articles in accordance with this invention is adsorbed thereon and/or penetrates the surface of the resin and is absorbed therein, to give an article having the agent impregnated thereon.

Although compositions such as the antistatic compositions are useful when comprised substantially of the stated amides or other agents and a solvent therefor, the compositions can also contain small amounts of other additives, such as antioxidants and the like, provided the additional ingredients are not present in amounts sufficient to substantially alter the effectiveness of the stated composition such as the alkanol amides for decreasing the tendency of the polymer to accumulate electrostatic charges.

It has been found that the antistatic composition of this invention, when applied to the surface of the article by first applying the composition onto the mold face, reduces and maintains the electrostatic charges reduced for extended periods of time below a potential of 2 to 5 kilovolts. This is generally sufficient to eliminate dust or dirt accumulation.

The invention is broadly applicable to the treatment of polymers of 1-olefins containing from 2 to 8 carbon atoms per molecule. The term "polymer" is intended to include both homopolymers and copolymers of said 1-olefins. Suitable polymers include polyethylene, polypropylene, polybutene, copolymers of ethylene and propylene, ethylene and butene, propylene and butene, and the like. Particularly suitable are solid polymers of ethylene having a density in the range of at least 0.940 gm./cc., preferably in the range of 0.940 to 0.990 gm./cc. Although a number of methods have been proposed for the preparation of these high-density polyolefins, the invention is not limited to any one method in particular. One suitable method of preparation is disclosed in the patent to Hogan and Banks, U.S. 2,825,721, issued Mar. 4, 1958.

The following example will serve further to illustrate this invention.

Example

A plastic bowl of high-density polyethylene prepared in accordance with the method of Hogan et al. supra having a density of 0.96 gm./cc. was formed in a conventional injection molding apparatus having the mold surface thereof previously coated with spraying a 10 percent solution of the diethanol amide of lauric acid in isopropanol.

A second bowl of high-density polyethylene was formed in a conventional injection molding apparatus having the mold surface thereof previously coated by wiping with a 2 percent solution of the diethanol amide of lauric acid in water.

Bottles of high-density polyethylene were formed in a conventional blow molding apparatus having the mold surface thereof previously coated with a 10 percent solution of the diethanol amide of lauric acid in isopropanol.

Additional bottles were formed using the injection molding and blow molding apparatus employed in the formation of the above bottles with the exception that the mold surfaces were not treated prior to the formation of the desired articles.

The following results were obtained:

| | Spark jump less than 20% rel. hum. (specimen rubbed 60 times with wool cloth) | Volt meter reading (kilovolts) (specimen rubbed 60 times with wool cloth) | Ash accumulation [2] less than 20% rel. hum. (specimen rubbed 10 times with wool cloth) |
|---|---|---|---|
| Injection molded | | | |
| Control (no antistatic agent) | Yes | 20 | Heavy. |
| 10% solution (antistatic agent [1] in isopropyl alcohol), sprayed on mold. | No | 0 | None. |
| 2% solution (antistatic agent [1] in water), wiped on mold. | No | −1 | Do. |
| Blow molded | | | |
| Control (no antistatic agent) | Yes | −14 | Heavy. |
| 10% solution (antistatic agent [1] in isopropyl alcohol), sprayed on mold. | No | −8 | Slight. |

[1] 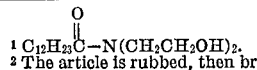
[2] The article is rubbed, then brought near to ashes in a tray.

The above data indicate that good antistatic properties are obtained by forming the articles in precoated molds.

Various modifications of this invention can be made, or followed, in view of the foregoing disclosure without departing from the spirit or scope thereof.

I claim:

1. In a process for the fabrication of resinous polymers so as to produce plastic articles therefrom having the outer surface thereof resistant to debilitative action, the improvement which comprises rendering the outer surface of said article resistant to said debilitative action by applying an antidebilitative agent selected from the group consisting of 2,2′-thiobis(6-cyclohexyl-p-cresol), 4,4′ - thiobis(6 - tert-butyl-m-cresol), 2,6-di-tert-butyl-p-cresol, hexaphenyl benzene, tertiary butyl phenyl salicylate, 2-hydroxy-5-alkylbenzophenone, N,N-dimethyl sulfenyl dithiocarbamate, dimethyl-2-picoline, 1,1,1-trichloro-2,2-bis(p-chlorophenyl) ethane, di-n-propylpyridine-2,5-dicarboxylate, and 2,2′-methylene-bis[3,4,6-trichlorophenol] to the surface of the mold means used in the fabrication of said article prior to the formation of said article and thereafter forming the article in the resulting coated mold means so as to produce thereby an article having its surface impregnated with said antidebilitative agent.

2. A method according to claim 1 for treating the surface of a solid polymer so as to prevent damage thereto by rodents which comprises dissolving N,N-dimethyl sulfenyl dithiocarbamate in a solvent therefor and applying the resultant solution to the surface of the means used for forming the solid polymer in an amount sufficient to repel the rodents from the surface of said solid polymer when formed in said means.

3. In a process for the fabrication of a solid article of a solid polymer of a monoolefin so as to produce an article therefrom having the outer surface thereof destaticized, the improvement which comprises applying to the surface of the mold means used for forming said solid article prior to the formation of said solid article and in an amount sufficient to reduce the electrostatic potential of the surface of the solid article when formed in said means a dialkanol amide having the structural formula

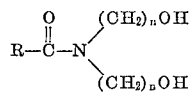

wherein R is an alkyl group containing from 6 to 16 carbon atoms and $n$ is an integer of from 2 to 4 and thereafter forming the article in the resulting coated mold means so as to produce thereby an article having its surface impregnated with said dialkanol amide.

4. In a process for the fabrication of polyethylene having a density of at least 0.940 gm./cc. so as to produce a solid article therefrom having the surface thereof destaticized, the improvement which comprises destaticizing the outer surface of said article by dissolving from 5 to 20 parts by weight of the diethanol amide of lauric acid in from 95 to 80 parts by weight of isopropyl alcohol based on composition weight, and applying the resulting solution to the surface of the mold means used for forming the solid polyethylene article of said polyethylene prior to the formation of said article in an amount sufficient to reduce the electrostatic potential of the surface of the solid polyethylene article when formed in said means and thereafter forming the article in the resulting coated mold means so as to produce thereby an article having its surface impregnated with said solution.

References Cited

UNITED STATES PATENTS

| | | | |
|---|---|---|---|
| 2,705,669 | 4/1955 | Leston | 264—338 |
| 3,183,202 | 5/1965 | Baird | 260—32.6 |

FOREIGN PATENTS

| | | |
|---|---|---|
| 670,779 | 9/1963 | Canada. |

OTHER REFERENCES

Cited for information: The Merck Index, seventh edition, 1960, p. 1118.

JOSEPH L. SCHOFER, *Primary Examiner.*

F. L. DENSON, L. EDELMAN, *Assistant Examiners.*